United States Patent [19]

Gile

[11] Patent Number: 4,926,337

[45] Date of Patent: May 15, 1990

[54] AUTOMATIC WORKPART CENTERING MECHANISM FOR A CHUCK

[75] Inventor: Richard H. Gile, North Clarendon, Vt.

[73] Assignee: Bryant Grinder Corporation, Springfield, Vt.

[21] Appl. No.: 218,563

[22] Filed: Jul. 13, 1988

[51] Int. Cl.⁵ .................... G06F 15/46; B23B 15/00
[52] U.S. Cl. .................... 364/474.06; 33/642; 33/644; 51/165.75; 82/170; 364/474.34; 279/1 L
[58] Field of Search ............ 364/474.34, 474.06, 364/474.17, 474.18, 474.34, 474.37, 551.02; 318/571, 572, 632; 51/49, 289 R, 165.71, 165.75, 165.87, 165.88, 165.9, 165.91, 165.92, 165.83, 277; 409/174; 279/1 L, 1 M, 1 J, 1 R, 6, 111; 82/117, 118, 170; 33/550, 640, 641, 642, 644, 645

[56] References Cited

U.S. PATENT DOCUMENTS

| | | | |
|---|---|---|---|
| 2,434,661 | 1/1948 | Krueger | 33/644 |
| 3,256,754 | 6/1966 | Rivierie et al. | 408/241 R |
| 4,190,889 | 2/1980 | Etoh et al. | 364/474.34 |
| 4,281,385 | 7/1981 | Nakaso et al. | 364/474.34 |
| 4,502,125 | 2/1985 | Yoneda et al. | 364/474.06 X |
| 4,590,573 | 5/1986 | Hahn | 364/...6 |
| 4,653,235 | 3/1987 | Farmer | 51/165.87 |
| 4,715,147 | 12/1987 | Millay et al. | 364/474.06 X |
| 4,790,545 | 12/1988 | Ozewaltowski et al. | 279/1 L |

FOREIGN PATENT DOCUMENTS

| | | | |
|---|---|---|---|
| 1423566 | 10/1968 | Fed. Rep. of Germany | 33/550 |
| 143106 | 7/1980 | German Democratic Rep. | 82/45 |
| 146266 | 2/1981 | German Democratic Rep. | 33/550 |

Primary Examiner—Joseph Ruggiero
Attorney, Agent, or Firm—Hamilton, Brook, Smith & Reynolds

[57] ABSTRACT

An automatic workpart centering mechanism for a magnetic or other chuck of a machine tool is provided. A computer microprocessor controls a digital air pressure regulator and/or an air solenoid valve to supply air pressure to a pneumatic centering hammer to control striking force on a workpart as it is rotated by the chuck and held thereon by a given chuck holding force with the location of the striking force on the workpart also under control of the microprocessor.

58 Claims, 4 Drawing Sheets

AUTOMATIC WORKPART CENTERING MECHANISM FOR A CHUCK

FIELD OF THE INVENTION

The invention relates to machine tools such as internal and external grinding machines and, in particular, to a workpart centering mechanism for a workpart chuck that holds and rotates the workpart for machining on a machine tool.

BACKGROUND OF THE INVENTION

In production type of machining operations, magnetic faceplate chucking is infrequently used since time is lost and skilled operator attention is required for centering each workpiece on the faceplate. A dial indicator and skillfully dealt hammer blows to the workpiece are required to center the workpiece. Of course, the object for the operator is to center the workpiece on the faceplate with the geometrical axis of the workpiece substantially coaxial with the rotational axis of the faceplate that is attached on a rotatable spindle.

It is an object of the invention to provide a centering mechanism for centering a workpiece on a magnetic or other chuck and which eliminates the time consuming and labor intensive manual centering technique and is under automatic adaptive control of a computer control unit.

SUMMARY OF THE INVENTION

The invention contemplates a workpart centering mechanism for a magnetic or other chuck wherein the centering mechanism is operable to center a series of workparts in succession on the chuck from a position where the workpart axis of geometry is offset from the axis of rotation of the chuck to a position where the axes are generally aligned.

Each workpart is positioned on the chuck initially with its (workpart) axis offset and thus moving in an eccentric path around the chuck axis as the chuck rotates. The centering mechanism of the invention comprises a centering means for striking each workpart positioned on the chuck with multiple, successive blows including means for applying a force, e.g., a strike force or chuck holding force, to the workpart whose magnitude is varied as the axis of the workpart is moved in increments toward the chuck axis of rotation, means for sensing the magnitude of incremental displacement of each workpart on the chuck resulting from each strike and each force applied to the workpart, and means for generating an applied force magnitude (e.g., strike force magnitude or chuck holding force magnitude) versus workpart displacement magnitude relationship from the sensed incremental workpart displacement and from the magnitude of the applied force corresponding to each incremental workpart displacement. Means is provided for updating the relationship based on the centering of preceding workparts such that the magnitude of the next force to be applied (e.g., strike force or chuck holding force) to a workpart then on the chuck to effect movement of its axis closer to the chuck axis of rotation can be estimated with increased accuracy as the number of workparts centered on the chuck increases so as to center subsequent workparts in shorter times.

In a typical working embodiment of the invention, the workpart centering mechanism includes a centering hammer for striking each workpart positioned on the chuck with multiple, successive blows whose force is varied in magnitude as the workpart axis is moved in increments toward the chuck axis, means for sensing the magnitude of incremental displacement of each workpart on the chuck resulting from each strike force, and means for inputting into computer means for each workpart the magnitude of incremental workpart displacement and magnitude of the strike force to effect each displacement. The computer means includes algorithms to learn the centering process and develop and continually update the strike force magnitude versus workpart displacement magnitude relationship based on inputs thereto. The computer means estimates from the aforementioned relationship the magnitude of the next strike force to be delivered to a workpart then on the chuck to move its axis incrementally closer to the chuck axis.

The computer means also determines the angular location on the workpart at which the next striking force is to be delivered by correlating the time of occurrence of the magnitude of maximum eccentricity with the time a reference marker on the chuck is sensed. In one embodiment of the invention, a computer microprocessor receives signals from an eccentricity sensor representative of cyclic variations of eccentricity and signals from a sensor generating a cyclic pulse signal representative of cycles of revolution of the chuck. The computer correlates the cyclic variation in eccentricity with the pulse signal to determine the angular position of maximum eccentricity relative to a reference marker on the chuck.

In another typical working embodiment of the invention, the workpart centering mechanism includes a centering hammer for striking each workpart positioned on the chuck with multiple, successive blows whose force is constant and means for varying the magnitude of the chuck holding force applied to the workpart for each strike to move its axis closer to the chuck axis of rotation.

The invention also contemplates a method for centering a plurality of workparts in succession on the chuck by striking each workpart using multiple, successive centering blows including applying a variable force to the workpart whose magnitude is varied as the workpart axis moves toward the chuck axis in accordance with an applied force magnitude versus workpart displacement magnitude relationship developed from centering preceding workparts on the chuck to effect movement of the workpart axis closer to the chuck axis of rotation.

BEST MODE FOR PRACTICING THE INVENTION

FIGS. 1 through 5 illustrate a magnetic workpart chuck 10 for an internal or external grinding machine, although the invention is not limited to grinding machines or to magnetic chucks. As is known, an annular workpart W is held on magnetic chuck faceplate 12 with the geometrical axis of the workpart and the rotational axis of the faceplate 12 substantially coaxial or aligned. The chuck faceplate is attached on a rotatable spindle 14 in known fashion and spindle 14 is rotated by an electric motor 16 or other conventional and known means. The spindle 14 and motor 16 may comprise separate components drivingly connected for example by a drive belt 17 or pulleys, gear train, etc., or the spindle and motor may be integrated to provide a motorized spindle.

A suitable faceplate for use in the invention is available commercially as model no. AXM-8896 available from O. S. Walker Inc., Worcester, Mass.

Known mechanical workpart clamps or chucks can be used in the invention in lieu of the magnetic faceplate; e.g., roll clamping and air clamping where the workpart is held by rollers or air pressure against a faceplate on a spindle can be used in lieu of the magnetic faceplate 12 to be described below.

Spindle 14 and electric motor 16 are typically mounted on the base 20 of the grinding machine or a slide (not shown) movable on the base.

Figure 5:
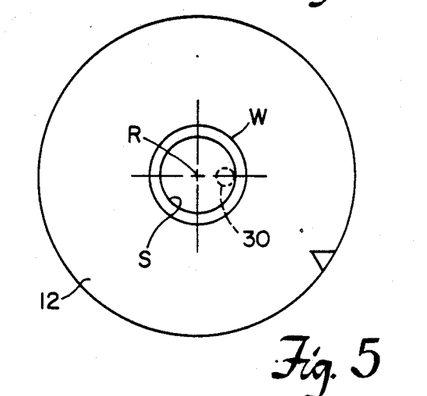
FIG. 5 is similar to FIG. 3 with the workpart substantially centered on the chuck.
Figure 6:
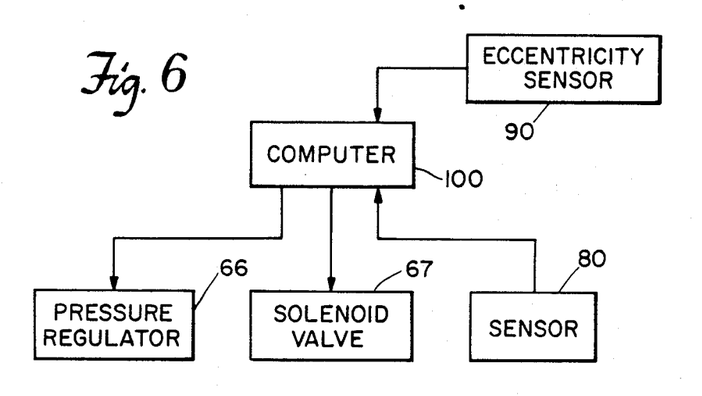
FIG. 6 is a schematic view of the control system for the centering mechanism.

A grinding wheel 30 is moved into the workpart bore for internal grinding and rotated and reciprocated against the inner annular surface S to grind same, FIG. 5. The grinding wheel is radially fed into the annular surface at a desired feed rate until the final ground dimension is achieved. The mechanism for moving the grinding wheel is well known in the art e.g., U.S. Pat. No. 4,653,235 issued Mar. 31, 1987, and forms no part of the present invention.

As is known, during grinding, the workpart W must be and remain centered on chuck faceplate 12 with its geometrical axis substantially coaxial with the rotational axis R of the faceplate and spindle.

Typically, successive workparts are ground one after another until the desired number have been ground. The workparts may be placed on the faceplate 12 in succession manually or by a workpart loader/unloader. The workpart loader/unloader may be of the type known in the art to place an unground workpart on the faceplate 12 after the previously ground workpart is removed therefrom.

Regardless of the workpart loader employed, the loader does not place the workpart on faceplate 12 in an exactly centered position with the workpart geometrical axis and chuck axis substantially coaxial. Instead, the workpart typically is placed on the faceplate 12 with a characteristic offset of the workpart axis G from the chuck axis R (FIG. 2) such that rotation of the chuck causes the workpart axis to travel in an eccentric path.

The same off-center positioning of the workpart will be experienced in the event the workpart is loaded onto the faceplate 12 manually by the machine operator.

Figure 2:
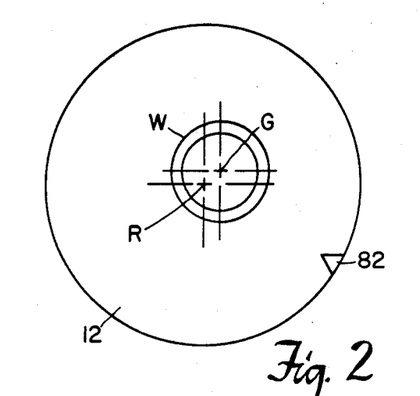
FIG. 2 is a partial front elevation of the chuck showing the workpart initially off-center on the chuck.
Figure 3:
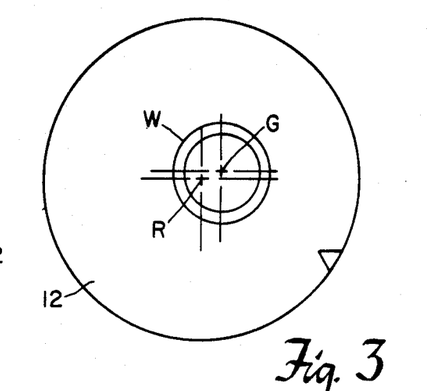
FIG. 3 is similar to FIG. 2 with the workpart off-center after a first blow from the centering hammer.
Figure 4:
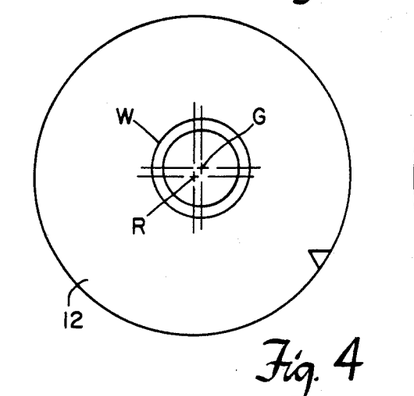
FIG. 4 is similar to FIG. 3 with the workpart still off-center after a second blow from the centering hammer.

The invention provides a centering mechanism 50 for repositioning the workpart of FIG. 2 to a centered position on the faceplate 12 shown in FIG. 5 with the workpart axis and chuck axis substantially coaxial within desired tolerance in much reduced time and with much less involvement of the machine operator. As mentioned above, the centering mechanism of the invention can be used on magnetic chucks and also on other known mechanical chucks such as roll clamping, air clamping and other workpart clamps or chucks.

Figure 1:
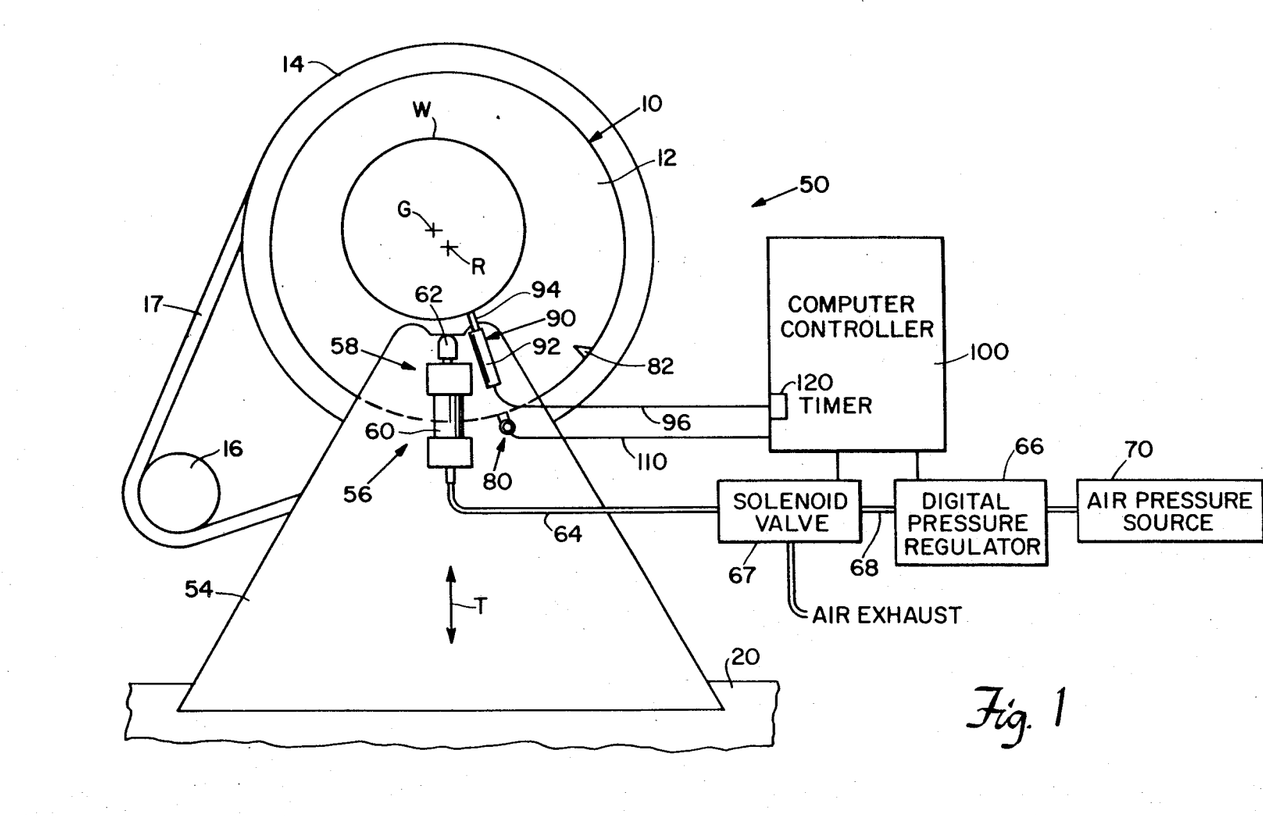
FIG. 1 is a front elevation of the magnetic workpart chuck of the invention having a workpart centering mechanism.

Referring to FIG. 1, the centering mechanism includes a support slide 54 that is movable on base 20 toward and away from (see arrow T) the chuck axis of rotation R. The support slide carries a centering means 56 in the form of a pneumatic centering hammer mechanism 58 having cylinder housing 60 secured on the support slide and a centering piston or hammer 62 in the cylinder housing. The cylinder housing 60 is connected by conduit 64 to a single-coil, three-way air solenoid valve 67 which receives pressurized air through conduit 68 from a conventional air pressure source 70 via digital air pressure regulator 66. The pressure regulator and air solenoid valve will be described in detail hereinafter. A single-acting spring-return cylinder 60 is illustrated. Although described hereinabove with respect to a pneumatic centering system, the invention is not so limited and other fluid or electric (such as electromagnetic) systems can be used.

Figure 1A:
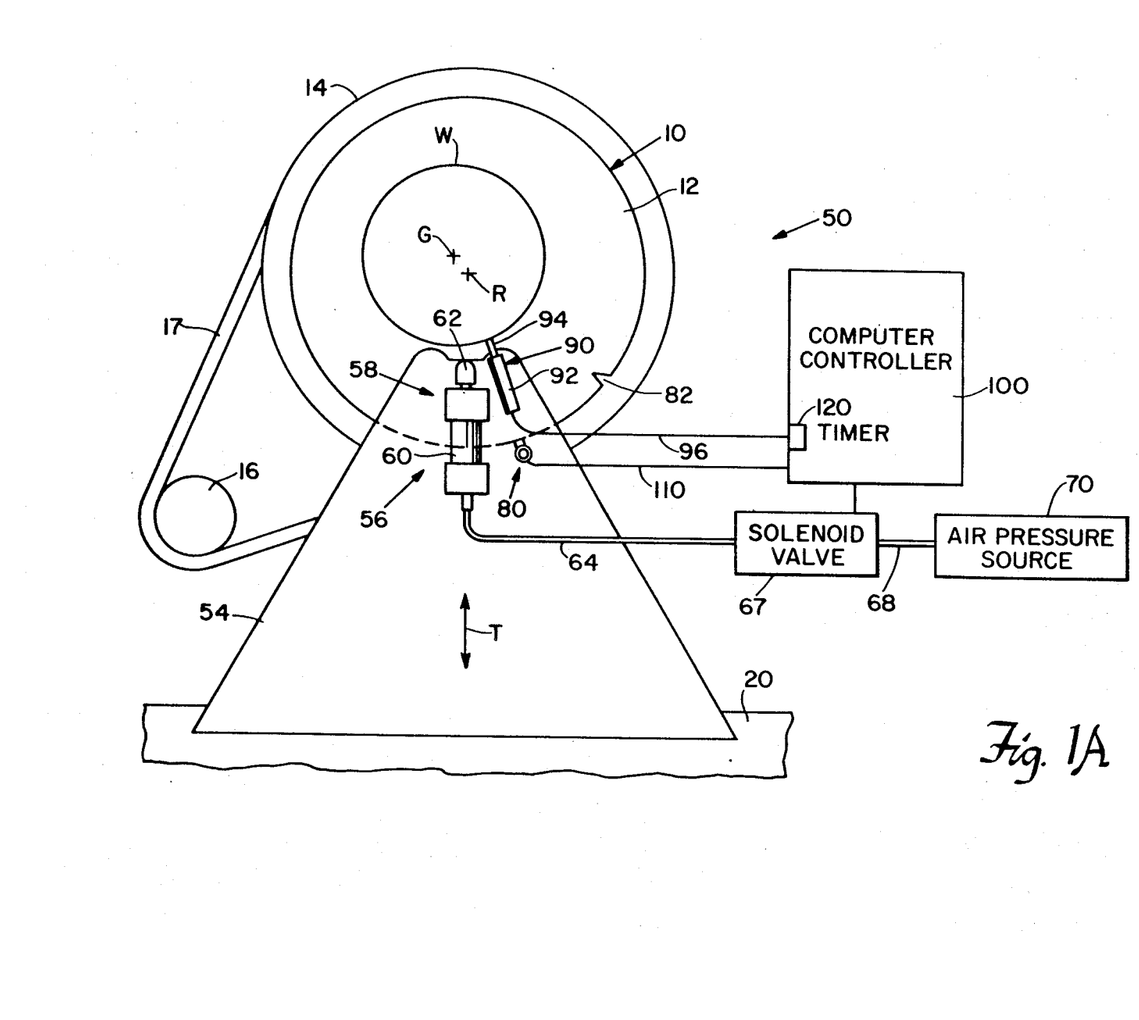
FIG. 1A is a front elevation of another embodiment of the magnetic workpart chuck of the invention having a workpart centering mechanism.

An alternative embodiment of the centering means 56 is shown in FIG. 1A. Instead of adjusting the air pressure, the duration of the opening of the solenoid valve 67 is adjusted to adjust the intensity of the hammer blow for a given air pressure level supplied to the cylinder 60. The solenoid valve 67 in this case must be a double-coil closed-center valve. The computer energizes the second coil of the solenoid valve 67 shortly after the deenergization of the first coil thereof, thereby allowing the return spring of cylinder 60 to retract the hammer 62 to prepare for the next blow by venting air from the cylinder 60 to the atmosphere.

The support slide 54 also carries a sensing means 80 for sensing rotational cycles of the faceplate 12. The sensing means 80 is preferably a sensor of the type that will generate a pulse signal when a reference marker 82 on the faceplate 12 passes the sensor as the faceplate is rotated. A typical reference marker may comprise a magnet and the sensor 80 may comprise a coil in which an electrical current is generated as the magnet marker passes thereby. Of course, other rotational speed sensors can be used for generating a pulse signal whose frequency is indicative of rotational cycles of the faceplate or the workpart itself.

The pulse signal generated by the sensor 80 is input to a computer unit 100 via lead wire 110.

The support slide 54 also carries an eccentricity sensor 90 having a housing 92 secured on the support slide and a plunger 94 movable in the housing 92 as the workpart W rotates against the plunger. Preferably, the eccentricity sensor 90 is a linear variable differential transformer, such an eccentricity sensor being available commercially as model no. LBB from Schaevitz Engineering Co. of Pennsauken, N.J. The displacement of plunger 94 as the eccentrically positioned workpart rotates thereby provides an electrical signal indicative of the magnitude of the eccentricity of the workpart to the computer unit 100 via lead wire 96.

The speed sensor 80 and eccentricity sensor 90 are secured in fixed relative angular position to one another on the support slide 54.

The computer unit 100 comprises a conventional computer microprocessor board having read only memory (ROM) and random access memory (RAM). The amount of the ROM and RAM required in the microprocessor will depend on the algorithms selected to learn the workpart centering process as well as develop the strike force magnitude versus incremental workpart displacement magnitude relationship as will be described hereinafter.

A timer 120 interfaces between the sensor 80 and the computer control unit 100 to measure rotational velocity of the faceplate 12 based on pulse signals received from the speed sensor 80 as the reference marker 82 passes it during faceplate rotation. The timer will cause a processor interrupt at regular intervals to thereby maintain a software timer in the microprocessor.

In a preferred version of the invention, the angular position of the workpart is to be determined within one degree accuracy and the maximum speed of rotation of the faceplate 12 during centering is 60 rpm. The timer interrupt period should therefore be 1/360 of a second (2.7 millisecond). If the minimum speed of faceplate rotation is expected to be 6 rpm, then the maximum count of the software timer should be 3600.

The computer microprocessor may include a standard bus computer system such as a model MF-80 processor board available from Matrix Corp. of Raleigh, N.C. The MF-80 processor board includes a Z-80 processor and can be configured with 12K of EPROM (Eraseable Programmable Read Only Memory) and 2K of RAM. This processor board also contains a hardware timer (corresponding to timer 120) that can be configured to cause interrupts at programmed intervals.

A multibus computer system is also usable and may include an iSBC 80/10 processor board available from Intel Corp. of Santa Clara, Calif., which includes an 8080A processor with up to 4K bytes of RAM and 16K of ROM, multiple digital I/O lines and an interval timer.

A custom single chip computer board may also be used.

Regardless of the computer unit selected, the microprocessor will determine for a particular series of workparts the location of maximum eccentricity of the workpart relative to the reference marker 82 on the chuck using the sensed magnitude of eccentricity and rotational cycles of the faceplate and will include a centering algorithm that will interpolate from a continually updated look-up table of air (fluid) pressure (i.e., air pressure supplied to cylinder 60) versus incremental workpart displacement (from sensors 80,90) the optimum magnitude of air pressure to be supplied to cylinder 60 (that determines the striking force of hammer piston 62) to move the workpart axis closer to the chuck axis R on the next strike delivered to the workpart. The look-up table in the computer means 100 is continually updated in accordance with a learning algorithm. The computer unit 100 may also determine using a suitable algorithm a lead or lag angle for striking the workpart at an angular position other than that corresponding to the maximum eccentricity of the workpart.

A suitable digital air pressure regulator 66 may be commercially available, or may be constructed by combining a commercial servo valve with a suitable pressure transducer and amplifier, or by combining an A/D converter with a current-to-pneumatic converter such as Model E69 from The Foxboro Co. of Foxboro, Mass. These components and the air solenoid valve 67 are commercially available.

The computer unit determines the magnitude and angular position of maximum eccentricity of the workpart based on signals received from sensors 80,90 during the first 360° rotation of the faceplate 12. The magnitude and angular position of maximum eccentricity is expressed as a vector $V_1$ in polar coordinates $\theta_1$ (angular position relative to the reference marker 82 on the faceplate as measured in the direction of rotation) and $r_1$ (a radius corresponding to magnitude of maximum eccentricity relative to the chuck axis R).

On the next 360° rotation of the faceplate, the computer control unit 100 now directs the hammer piston 6 to strike the workpart at the peripheral location having maximum eccentricity since the computer unit knows from its firmware where the centering piston 62 is in relation to the reference marker 82. The strike force on the workpart is estimated by the computer unit by linearly interpolating known data in the look-up table and stored in the microprocessor memory.

Immediately after each applied hammer strike, the next successive magnitude and angular position of maximum eccentricity of the workpart is determined (e.g., vector $V_n$ having polar coordinates $\theta_n, r_n$) based on signals from sensors 80,90 and the look-up table is updated accordingly (i.e., the newly learned or determined workpart displacement magnitude from the previous strike is input for that level of strike force).

The error in eccentricity after each strike force may be measurable within the next 90° of rotation of the faceplate since the eccentricity error is a sine function. Measuring the error in eccentricity within the next 90° will allow a new correction (another centering strike) within 180° in the situation of an over-correction of eccentricity.

The striking sequence is repeated for each workpart until each workpart is centered on the faceplate 12, FIGS. 2-5, within a desired centering tolerance input and stored in the memory of the microprocessor 100.

As more of the same type of workparts are successively centered on the faceplate 12, the computer unit 100 will continually update the look-up table and will become progressively more accurate in its ability to estimate (interpolate) the required force for the next succeeding hammer strike to a workpart then on the faceplate depending on the sensed magnitude and angular position of maximum eccentricity of that workpart. As a result, centering of subsequent workparts on the faceplate 12 can be effected in shorter times.

A suitable centering algorithm (A) for effecting the workpart centering process, a learning algorithm (B) for updating the look-up table as described hereinabove and an algorithm (C) for determining a suitable lead or lag angle are as follows:

(A) Strike workpart at point of maximum eccentricity with a strike force determined by interpolation in the look-up table for that amount of eccentricity.

(B) Multiply the pertinent strike force in the look-up table by $$\frac{r_{n-1} + 1/2 \; r_n[\cos(\theta_{n-1} - \theta_n)]}{r_{n-1}}$$

where r represents the magnitude of eccentricity and $\theta$ represents the angular position thereof as set forth hereinabove.

(C) Strike the workpart at the point of maximum eccentricity plus or minus an angle $\alpha$ where a plus value of angle $\alpha$ means earlier and a minus value later, and where $$\alpha = \frac{\theta_n - \theta_{n-1}}{2} \text{ if } \alpha < 90°, \text{ and } \alpha = 0 \text{ if } (\theta_n - \theta_{n-1}) > 90°.$$

These algorithms are arrived at based on an experimentally determined relationship between air pressure to cylinder 60 or air hammer solenoid pulse width versus incremental workpart movement or displacement in response to a strike for a given workpart mass and composition, constant magnetic chuck holding force, air hammer mass and angular displacements of the air hammer and sensors.

An initial look-up table of strike force magnitude versus incremental workpart magnitude is input into the memory of the computer microprocessor in the form of data previously generated by centering a selected number of workparts. Once the initial look-up table is entered and stored in the microprocessor, it is updated based on data generated and entered in centering subsequent similar workparts automatically on the faceplate 12 using the centering mechanism 50.

The look-up table can be updated by the computer microprocessor using averaged values for strike force magnitude and corresponding workpart displacement magnitude for a preselected number of preceding similar workparts. For example, the computer microprocessor may determine average values for the strike force magnitudes and corresponding workpart displacement magnitudes for the first five workparts centered automatically on the faceplate and use these average values to update the look-up table.

Alternatively, the computer microprocessor may update the look-up table for each strike force magnitude and corresponding incremental workpart displacement magnitude input into the microprocessor for each workpart previously centered on the faceplate 12.

The particular technique employed to update the look-up table will depend on the sophistication of the algorithm employed and of the microprocessor software employed. Regardless of the up-dating technique employed, updating of the look-up table is effected in such a way to enable the microprocessor to become progressively more accurate in its ability to estimate (by interpolating the look-up table) the required force for the next succeeding hammer strike to a workpart then on the faceplate 12 to move the workpart axis closer G to the chuck axis R so as to achieve centering of workparts subsequently positioned on the faceplate 12 in shorter times. When a large number of similar workparts are successively centered, the time for centering the workparts will progressively decrease to a more or less average "minimum" or "optimum" centering time after a given number of workparts have been centered.

In a preferred embodiment of the invention, the computer unit 100 controls the magnetic force level of the faceplate 12 between a given, constant reduced level during workpart centering and a given, constant, relatively higher level for grinding the workpart after it is centered. Reduced holding force is applied during workpart centering to facilitate movement of the workpart by the centering hammer. The computer unit 100 controls a switch or a continuously variable control (not shown) that selects either the lower or higher of the magnetic force levels to be applied.

In the above discussion, the centering mechanism has been described for centering in succession a plurality of the same type of workpart on the chuck. In the event a series of a different type of workpart is to be centered in succession thereafter, the machine operator can inform through a suitable switch means on the computer unit 100 that a new learning cycle should be initiated for the next series of different workparts.

Figure 7:
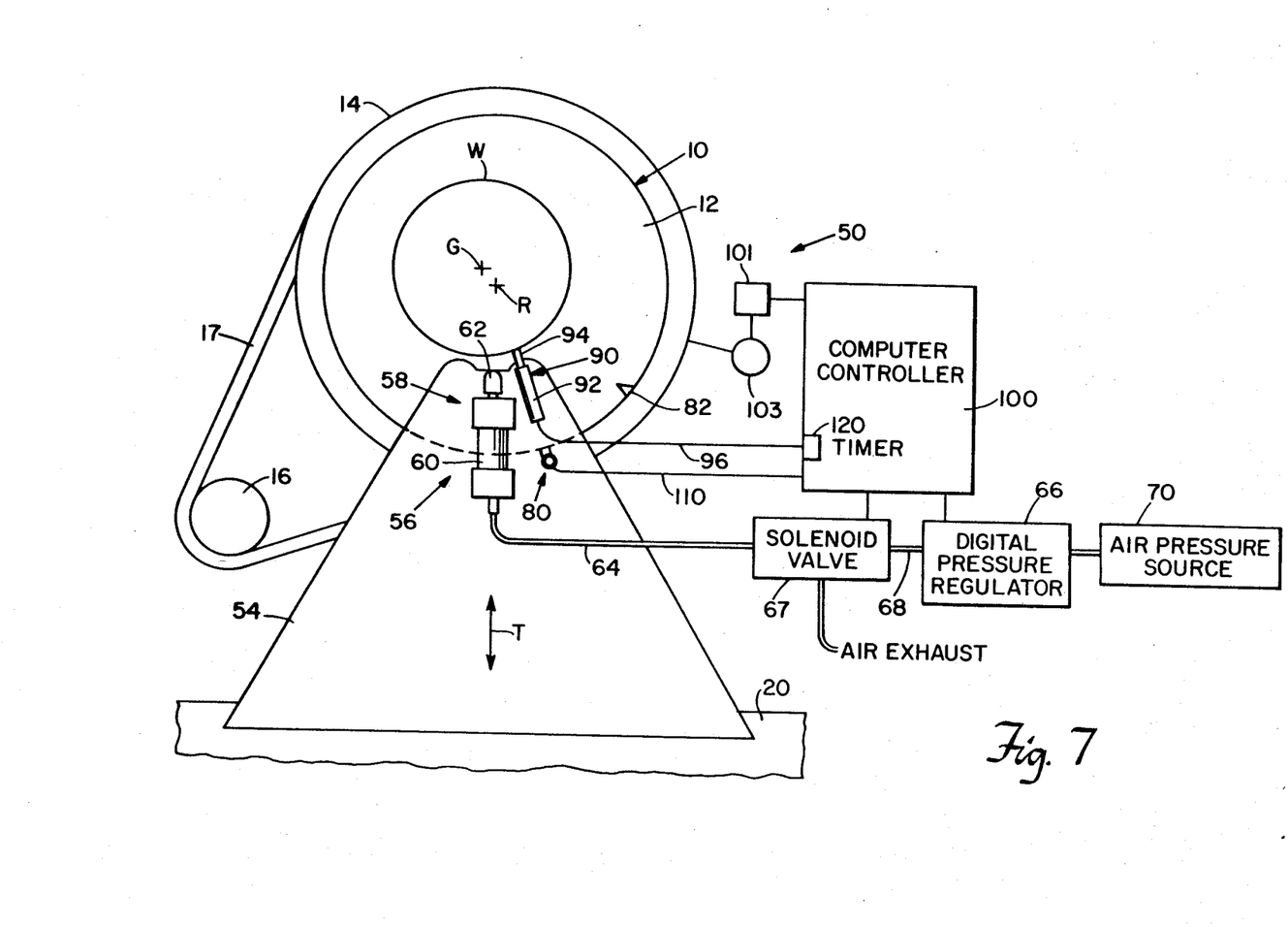
FIG. 7 is a schematic view of the control system for another embodiment of the centering mechanism of the invention.

FIG. 7 illustrates another embodiment of the invention wherein the variable force applied to the workpart to move its axis closer to the chuck axis of rotation R comprises a chuck holding force applied to the workpart that is varied to move the axis of the workpart closer to the chuck axis of rotation for successive hammer strikes whose strike force is maintained constant. In FIG. 7, components or features like those of FIGS. 1 and 1A are designated by like reference numerals.

In this embodiment of the invention, the computer control unit 100 varies the magnetic force level of the magnetic faceplate 12 with each successive hammer blow to move the workpart axis in increments closer to the chuck rotational axis R (for each constant strike force) in accordance with a chuck holding force magnitude versus incremental workpart magnitude relationship stored in the computer memory as a look-up table. The look-up table is up-dated based on the centering of preceding workparts as described hereinabove for the first-described embodiment of the invention.

The computer control unit 100 receives signals from sensors 80, 90 and carries out the same determinations as in the first-described embodiment, including updating of the look-up table of chuck holding force magnitude versus incremental workpart displacement magnitude. The computer control unit 100 directs the hammer piston 62 to strike the workpart at the desired location thereon with the chuck holding force applied to the workpart being estimated by the computer control unit by interpolation of the data in the look-up table and stored in the microprocessor memory. The computer control unit 100 varies the magnetic force level of the faceplate 12 by sending appropriate commands to a current source 101 providing electrical current to an electromagnet coil 103 associated with the chuck 10. The computer control unit 100 may also control the digital pressure regulator 66 and the solenoid valve 67 to provide a substantially constant strike force and strike duration, although the regulator 66 and valve 67 may be controlled by conventional control devices not interfaced with the computer control unit 100.

While the invention has been described in terms of specific preferred embodiments thereof, it is not intended to be limited thereto but rather only to the extent set forth in the following claims.

We claim:

1. In combination with a workpart chuck having a chuck axis of rotation for rotating a workpart about its workpart axis when the axes are substantially aligned, apparatus for centering each workpart in a series of workparts successively positioned on the rotating chuck from an initial offset position where the workpart axis moves in an eccentric path relative to the chuck axis, comprising:

(a) centering means for striking each workpart positioned on the chuck with multiple, successive blows, including means for applying a force to the workpart that is varied in magnitude as the axis of the workpart is moved in increments toward the chuck axis of rotation,
(b) means for sensing the magnitude of incremental displacement of each workpart on the chuck resulting from each applied force and blow to the workpart,
(c) means for generating an applied force magnitude versus workpart displacement magnitude relationship from the sensed magnitude of incremental displacement of each workpart on the chuck and the magnitude of the applied force corresponding to the incremental displacement, and
(d) means for updating said relationship based on the centering of preceding workparts and estimating from said relationship the magnitude of the next force to be applied to a workpart then on the chuck to effect movement of its axis closer to the chuck axis of rotation when struck with said blows.

2. In combination with a workpart chuck having a chuck axis of rotation for rotating a workpart about its workpart axis when the axes are substantially aligned, apparatus for centering each workpart in a series of workparts successively positioned on the rotating chuck from an initial offset position where the workpart axis moves in an eccentric path relative to the chuck axis, comprising:
(a) centering means for striking each workpart positioned on the chuck with multiple, successive blows whose strike force is varied as the axis of the workpart is moved in increments toward the chuck axis of rotation,
(b) means for sensing the magnitude of incremental displacement of each workpart on the chuck resulting from each strike force,
(c) means for generating a strike force magnitude versus workpart displacement magnitude relationship from the sensed magnitude of incremental displacement of each workpart on the chuck and the magnitude of the strike force causing the incremental displacement, and
(d) means for updating said relationship based on the centering of preceding workparts and estimating from said relationship the magnitude of the next strike force to be delivered to a workpart then on the chuck to effect movement of its axis closer to the chuck axis of rotation when struck with said blows.

3. In combination with a workpart chuck having a chuck axis of rotation for rotating a workpart about its workpart axis when the axes are substantially aligned, apparatus for centering each workpart in a series of workparts successively positioned on the rotating chuck from an initial offset position where the workpart axis moves in an eccentric path relative to the chuck axis, comprising:
(a) centering means for striking each workpart positioned on the chuck with multiple, successive blows whose strike force is varied as the axis of the workpart is moved in increments toward the chuck axis of rotation,
(b) computer means,
(c) means for sensing the magnitude of incremental displacement of each workpart on the chuck resulting from each strike force,
(d) means for inputting for each workpart the magnitude of incremental workpart displacement and magnitude of the strike force to effect said displacement into the computer means to develop a strike force magnitude versus workpart displacement magnitude relationship, and
(e) said computer means updating said relationship based on the centering of preceding workparts and estimating from said relationship the magnitude of the next strike force to be delivered to a workpart then on the chuck to effect movement of its axis closer to the chuck axis of rotation when struck with said blows.

4. The combination of claim 3 wherein the computer means determines the angular position of the maximum eccentricity of the workpart based on the sensed magnitude of eccentricity and rotational cycle of the chuck.

5. The combination of claim 4 wherein the computer means actuates the centering means to strike a workpart on the chuck at an angular position on the chuck corresponding to the maximum eccentricity of the workpart.

6. The combination of claim 4 wherein the computer means determines a lead or lag time for actuating the centering means to strike the workpart at an angular position other than that corresponding to the maximum eccentricity.

7. The combination of claim 3 wherein the striking force versus workpart displacement magnitude relationship is maintained as a look-up table in the computer means.

8. The combination of claim 7 wherein the computer means interpolates the look-up table to estimate the magnitude of the next striking force to be delivered to a workpart then on the chuck.

9. The combination of claim 3 wherein said centering means comprises a fluid cylinder and centering piston for striking the workpart.

10. The combination of claim 8 further including a fluid pressure regulator between the cylinder and a source of fluid pressure, said fluid pressure regulator receiving control signals from the computer means that control fluid pressure supplied to the cylinder to strike the workpart with the estimated striking force determined by said computer control means.

11. The combination of claim 8 further including a fluid solenoid valve between the cylinder and a source of fluid pressure, said fluid solenoid valve receiving signals from the computer means that control the solenoid valve pulse duration.

12. The combination of claim 3 wherein the chuck includes a magnetic faceplate for holding the workpart thereon.

13. The combination of claim 12 wherein the computer means controls the magnitude of magnetic holding force on the faceplate.

14. The combination of claim 13 wherein the computer means establishes a first magnetic holding force on the faceplate during workpart centering and a second higher magnetic holding force on the faceplate after the workpart is centered.

15. The combination of claim 3 wherein the means for sensing magnitude of eccentricity comprises a linear variable differential transformer.

16. The combination of claim 3 further including means for sensing rotational cycles of the chuck and generating a pulse signal representative of cycles of revolution of the chuck.

17. The combination of claim 16 wherein the means for sensing rotational speed comprises a reference marker on the chuck and a marker sensor for sensing when the marker passes thereby as the chuck rotates.

18. The combination of claim 3 wherein the computer means determines angular position of the maximum eccentricity of the workpart by correlating the sensed maximum eccentricity with the pulse signals received from the rotational speed sensing means.

19. In combination with a workpart chuck having a chuck axis of rotation for rotating a workpart about its workpart axis when the axes are substantially aligned, apparatus for centering the workpart in a series of workparts successively positioned on the rotating chuck from an initial offset position where the workpart axis moves in an eccentric path relative to the chuck axis, comprising:
  (a) centering means for striking each workpart positioned on the chuck with multiple, successive blows whose strike force is varied as the axis of the workpart is moved in increments toward the chuck axis of rotation,
  (b) computer means,
  (c) means for sensing the magnitude of incremental displacement of each workpart on the chuck resulting from each strike force,
  (d) means for sensing rotational cycles of the chuck and inputting signals representative of said rotational cycles into the computer means,
  (e) means for inputting for each workpart the magnitude of incremental workpart displacement and magnitude of the strike force to effect said displacement into the computer means to develop a strike force magnitude versus workpart displacement magnitude relationship, and
  (f) said computer means updating said relationship based on the electrical signals received from centering of preceding workparts and estimating from said relationship the magnitude of the next strike force to be delivered to a workpart then on the chuck to effect movement of its axis closer to the chuck axis of rotation when struck with said blows,
  (g) said computer means determining the angular position of maximum eccentricity of each workpart on the chuck based on the sensed magnitude of maximum eccentricity and rotational cycles of the chuck and actuating said centering means to strike each workpart at a selected location relative to the location of maximum eccentricity.

20. In combination with a workpart chuck having a chuck axis of rotation for rotating a workpart about its axis when the axes are substantially aligned, apparatus for centering each workpart in a series of workparts successively positioned on the rotating chuck from an initial offset position where the workpart axis moves in an eccentric path relative to the chuck axis, comprising:
  (a) centering means for striking each workpart positioned on the chuck with multiple, successive blows of constant strike force,
  (b) means for varying chuck holding force on the workpart as the axis of the workpart is moved in increments toward the chuck axis of rotation by said blows,
  (c) computer means,
  (d) means for sensing the magnitude of incremental displacement of each workpart on the chuck resulting from each chuck holding force and blow applied to the workpart,
  (e) means for inputting for each workpart the magnitude of incremental workpart displacement and magnitude of the chuck holding force corresponding to said displacement into the computer means to develop a chuck holding force magnitude versus workpart displacement magnitude relationship, and
  (f) said computer means updating said relationship based on the centering of preceding workparts and estimating from said relationship the magnitude of the next chuck holding force to be applied to a workpart then on the chuck to effect movement of its axis closer to the chuck axis of rotation when struck with said blows.

21. The combination of claim 20 wherein the computer means determines the angular position of the maximum eccentricity of the workpart based on the sensed magnitude of eccentricity and rotational cycle of the chuck.

22. The combination of claim 21 wherein the computer means actuates the centering means to strike a workpart on the chuck at an angular position on the chuck corresponding to the maximum eccentricity of the workpart.

23. The combination of claim 21 wherein the computer means determines a lead or lag time for actuating the centering means to strike the workpart at an angular position other than that corresponding to the maximum eccentricity.

24. The combination of claim 20 wherein the chuck holding force versus workpart displacement magnitude relationship is maintained as a look-up table in the computer means.

25. The combination of claim 24 wherein the computer means interpolates the look-up table to estimate the magnitude of the next chuck holding force to be applied to a workpart then on the chuck.

26. The combination of claim 20 wherein the chuck includes a magnetic faceplate for holding the workpart thereon.

27. The combination of claim 26 wherein the computer means controls the magnitude of magnetic chuck holding force applied to the workpart.

28. The combination of claim 20 wherein the means for sensing magnitude of eccentricity comprises a linear variable differential transformer.

29. The combination of claim 20 further including means for sensing rotational cycles of the chuck and generating a pulse signal representative of cycles of revolution of the chuck.

30. The combination of claim 29 wherein the means for sensing rotational speed comprises a reference marker on the chuck and a marker sensor for sensing when the marker passes thereby as the chuck rotates.

31. The combination of claim 20 wherein the computer means determines angular position of the maximum eccentricity of the workpart by correlating the sensed maximum eccentricity with the pulse signals received from the rotational speed sensing means.

32. In combination with a workpart chuck having a chuck axis of rotation for rotating a workpart about its workpart axis when the axes are substantially aligned, apparatus for centering the workpart in a series of workparts successively positioned on the rotating chuck from an initial offset position where the workpart axis moves in an eccentric path relative to the chuck axis, comprising:
  (a) centering means for striking each workpart positioned on the chuck with multiple, successive blows of constant strike force, (b) means for varying chuck holding force on the workpart as the axis of the workpart is moved in increments toward the chuck axis of rotation by said blows, (c) computer means, (d) means for sensing the magnitude of incremental displacement of each workpart on the chuck resulting from each chuck holding force and blow applied to the workpart, (e) means for sensing rotational cycles of the chuck and inputting signals representative of said rotational cycles into the computer means, (f) means for inputting for each workpart the magnitude of incremental workpart displacement and magnitude of the chuck holding force corresponding to said displacement into the computer means to develop a chuck holding force magnitude versus workpart displacement magnitude relationship, and (g) said computer means updating said relationship based on the electrical signals received from centering of preceding workparts and estimating from said relationship the magnitude of the next chuck holding force to be applied to a workpart then on the chuck to move its axis closer to the chuck axis of rotation when struck with said blows, (h) said computer means determining the angular position of maximum eccentricity of each workpart on the chuck based on the sensed magnitude of maximum eccentricity and rotational cycles of the chuck and actuating said centering means to strike each workpart at a selected location relative to the location of maximum eccentricity.

33. A method for centering a plurality of workparts of the same type in succession on a rotating chuck having a chuck axis of rotation, comprising:

(a) rotating the chuck with the geometrical axis of each workpart offset from the chuck axis of rotation such that the workpart moves eccentrically, (b) striking each workpart positioned on the chuck with multiple, successive centering blows, including applying a force to each workpart that is varied in accordance with an applied force magnitude versus workpart displacement magnitude relationship developed from the centering of preceding workparts on the chuck to effect movement of the axis of the workpart toward the chuck axis of rotation when struck with said blows.

34. The method of claim 33 wherein the force that is applied to the workpart and varied in magnitude in accordance with said relationship comprises a strike force of the blows to the workpart.

35. The method of claim 33 wherein the force that is applied to the workpart and varied in magnitude in accordance with said relationship comprises the chuck holding force.

36. The method of claim 33 wherein step (b) is continued until the axis of the workpart is substantially coincident with the chuck axis of rotation.

37. The method of claim 33 including sensing the magnitude of each incremental workpart displacement after each workpart is struck.

38. The method of claim 37 including developing said relationship based on the sensed magnitude of incremental workpart displacement and the magnitude of the striking force.

39. The method of claim 37 including sensing the rotational speed of the chuck and determining the angular position on the chuck of the maximum eccentricity of each workpart.

40. The method of claim 39 including generating pulse signals representative of cycles of revolution of the chuck and said angular position of maximum eccentricity is determined by correlating the sensed eccentricity with the pulse signals.

41. The method of claim 39 wherein each workpart is struck at a location corresponding to the maximum eccentricity.

42. The method of claim 39 wherein each workpart is struck at a location other than that having the maximum eccentricity.

43. The method of claim 33 including holding each workpart by magnetic force on the chuck.

44. The method of claim 33 including developing a striking force versus workpart displacement magnitude relationship in the form of a look-up table and interpolating the table to estimate the magnitude of the next striking force to be delivered to a workpart then on the chuck to move the axis of the workpart closer to the chuck axis of rotation.

45. A method for centering a plurality of workparts of the same type in succession on a rotating chuck having a chuck axis of rotation, comprising:

(a) rotating the chuck with the geometrical axis of each workpart offset from the chuck axis of rotation such that the workpart moves eccentrically, (b) striking each workpart positioned on the chuck with multiple, successive centering blows whose strike force is varied in accordance with a striking force magnitude versus workpart displacement magnitude relationship developed from the centering of preceding workparts on the chuck to effect movement of the axis of the workpart toward the chuck axis of rotation when struck with said blows.

46. The method of claim 45 wherein step (b) is continued until the axis of the workpart is substantially coincident with the chuck axis of rotation.

47. The method of claim 45 including sensing the magnitude of each incremental workpart displacement after each workpart is struck.

48. The method of claim 47 including developing said relationship based on the sensed magnitude of incremental workpart displacement and the magnitude of the striking force.

49. The method of claim 47 including sensing the rotational speed of the chuck and determining the angular position on the chuck of the maximum eccentricity of each workpart.

50. The method of claim 49 including generating pulse signals representative of cycles of revolution of the chuck and said angular position of maximum eccentricity is determined by correlating the sensed eccentricity with the pulse signals.

51. The method of claim 49 wherein each workpart is struck at a location corresponding to the maximum eccentricity.

52. The method of claim 49 wherein each workpart is struck at a location other than that having the maximum eccentricity.

53. The method of claim 45 including holding each workpart by magnetic force on the chuck.

54. The method of claim 45 including developing a striking force versus workpart displacement magnitude relationship in the form of a look-up table and interpolating the table to estimate the magnitude of the next striking force to be delivered to a workpart then on the chuck to move the axis of the workpart closer to the chuck axis of rotation.

55. A method for centering a plurality of workparts of the same type in succession on a rotating chuck having a chuck axis of rotation, comprising:
(a) rotating the chuck with the geometrical axis of each workpart offset from the chuck axis of rotation such that the workpart moves eccentrically,
(b) centering a plurality of workparts in succession on the chuck by striking each workpart with multiple, successive centering blows including sensing the magnitude of incremental workpart displacement resulting from each strike and using for each workpart the magnitude of each incremental workpart displacement and magnitude of each strike force to effect said displacement as each workpart is centered to develop a strike force magnitude versus workpart displacement magnitude relationship wherein in centering the workparts, the force of the strikes delivered to each workpart then on the chuck is estimated from said relationship to effect movement of the axis of that workpart closer to the chuck axis of rotation with said blows until each workpart is substantially centered thereon.

56. The method of claim 55 including using the magnitude of incremental workpart displacement and magnitude of each strike force required in centering each workpart to update said relationship such that said relationship estimates the magnitude of the next strike force with increased accuracy as the number of workparts centered on the chuck increases.

57. A method for centering a plurality of workparts of the same type in succession on a rotating chuck having a chuck axis of rotation, comprising:
(a) rotating the chuck with the geometrical axis of each workpart offset from the chuck axis of rotation such that the workpart moves eccentrically,
(b) centering a plurality of workparts in succession on the chuck by striking each workpart with multiple, successive centering blows of constant strike force, including applying a chuck holding force to each workpart and sensing the magnitude of incremental workpart displacement for each chuck holding force resulting from each blow and using for each workpart the magnitude of each incremental workpart displacement and magnitude of each chuck holding force for said displacement as each workpart is centered to develop a chuck holding force magnitude versus workpart displacement magnitude relationship wherein in centering the workparts, the chuck holding force applied to each workpart then on the chuck is estimated from said relationship to effect movement of the axis of that workpart closer to the chuck axis of rotation when struck with the next blow until each workpart is substantially centered thereon.

58. The method of claim 57 including using the magnitude of incremental workpart displacement and magnitude of each chuck holding force required in centering each workpart to update said relationship such that said relationship estimates the magnitude of the next chuck holding force with increased accuracy as the number of workparts centered on the chuck increases.

* * * * *